2,784,071
SELECTIVE HERBICIDE

John A. Garman, Baltimore, Md., and Donald K. George, State College, Miss., assignors, by mesne assignments, to Food Machinery and Chemical Corporation, New York, N. Y., a corporation of Delaware No Drawing. Application March 25, 1954, Serial No. 418,775

8 Claims. (Cl. 71—2.6)

This invention relates generally to the selective destruction of plants and the selective control and inhibition of undesirable plant growth, and more particularly, it relates to a new herbicide and herbicidal compositons therefrom which are especially useful in selectively destroying plants and selectively controlling and inhibiting plant growth.

It has previously been proposed to destroy plants or selectively discourage plant growth by treating either the soil or the plants, or both, with solutions of organic carbamate compounds. For example, such compounds as isopropyl N-phenylcarbamate and isopropyl N-(3-chlorophenyl) carbamate are known as effective general weed killers or herbicides. It is highly desirable that such herbicides should be highly selective, that is, they should kill weeds and other undesirable plants but not adversely affect the desired plant crop under the same conditions. Many of the already known compounds cannot be used with common crops since the dosage level required to destroy the undesirable plants also destroys the crop.

The object of the present invention is to provide agricultural industry with a selective method for destroying weeds and other undesirable plants, or inhibiting the growth of such plants without affecting the growth of the desired plant crop, and thereby provide an herbicide of greater selectivity and usefulness than those heretofore known, in that, using this material, it is possible to control such serious weed pests as pigweed and crabgrass in the presence of crops of such major economic importance as cotton without crop damage.

This object and other objects, as will hereinafter appear, are accomplished by the present invention. This invention is based on the discovery that 2-(1-chloropropyl) N-(3-chlorophenyl) carbamate shows a surprisingly great herbicidal selectivity for many common undesirable plants, particularly the monocotyledonous grasses, at rates which do not adversely affect such common crops as peas, corn, cotton, and soybeans.

The formula for the new composition involved is as follows:

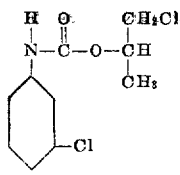

This carbamate shows a highly selective action against crabgrass and pigweed in the presence of such crop plants as cotton, stringbeans, peas, and corn.

This compound is stable under ordinary conditions and lends itself readily to formulation as in solutions, aqueous emulsions, impregnated dusts and the like. It is soluble in many of the common organic solvents, for instance, cyclohexanone, xylene, toluene, acetone, lower aliphatic alcohols, methylnaphthalenes, and the like. This compound has a particular advantage over compounds previously used as herbicides since it shows reduced volatility and hence prolonged residual activity and effectiveness in the treated soil. It is readily prepared in compositions at relatively high concentrations in organic solvents for shipping and storing and may be conveniently dispersed in aqueous emulsion form or otherwise at the point of use.

Advantageously, stable concentrates of the compound may be prepared for use in forming aqueous emulsions, of example, by mixing about 1 to 2 parts by weight of the carbamate, about 1 to 3 parts of organic solvent, and ½ to 1 part of a suitable emulsifying agent. At the point of use, this concentrate may be dispersed in from 4 to 100 parts of water to form an emulsion suitable for spraying. The concentrate is preferably diluted with about an equal volume of water immediately before the final dispersion for spraying.

A dusting powder may be prepared by impregnating 10 parts by weight of finely divided clay, or talc, or other inert solid carrier with a solution of 12 parts of the carbamate, two parts of a suitable emulsifying agent and 10 parts of a solvent such as acetone. The acetone is then evaporated and the residual impregnated dust may be further diluted with the same, or other carrier to 5% to 30% of active ingredients, by weight, and applied by means of conventional equipment and methods. The residual impregnated dust may also be added to a suitable volume of water or other non-solvent fluent carrier with vigorous agitation and the resulting suspension sprayed in the usual manner.

The compound is highly effective and selective whether used as a pre-emergent treatment, or as a post-emergent treatment. In post-emergent treatment, the herbicide will, usually, be applied primarily to the growing plant. In post-emergent treatment, however, the effects achieved are not necessarily due solely to the portion of the herbicide material which is subsequently retained on the growing plant parts since some effects are probably also achieved by some of the compound which actually reaches the soil and thereafter finds its way into the plant root system. In pre-emergent treatment, the herbicide will be applied to the soil, usually the seeded soil, before the plants have emerged therefrom and usually at the time of crop seeding. Reference herein, and in the appended claims to treating the "plant life" will be understood to include both the pre-emergent treatment and the post-emergent treatment.

It is believed that the compound herein described is a novel and heretofore unknown composition of matter and it is contemplated to be within the scope of this invention to claim it as such.

The invention will be further described and illustrated by the following specific examples of manufacture of the compound and its use and effectiveness. It will be understood that these examples are for illustrating the invention and are not to be considered as limiting the scope thereof.

In the tests described below in the examples, the carbamate was applied in alcoholic solutions in order to control more accurately the proportions of the herbicide used. Application of alcohol alone at many times the dosages used in these compositions shows no detectable phytotoxic effects. It will be understood that this carbamate is equally effective, for instance, in the form of solutions, suspensions, dry dusting powders, and aqueous emulsions. All parts given are by weight unless otherwise specified.

EXAMPLE 1

To 100 parts of 3-chlorophenylisocyanate dissolved in 300 ml. of benzene and in the presence of a trace of triethyl amine, was added approximately 165 parts of 1-chloro-2-propanol. The resultant mixture was refluxed for 4 hours. The solvent was removed at reduced pressure, and the product distilled. The fraction boiling at 160–165° C. at 0.1 mm. was collected, dissolved in carbon tetrachloride, and washed with water. The residual carbon tetrachloride solution was dried, and the carbon tetrachloride removed by vacuum stripping. The residual oil had a refractive index of $n_D^{25}$—1.5538. It analyzed for nitrogen, as follows: Calculated for $C_{10}H_{11}Cl_2NO_2$— 5.65% nitrogen; found—5.73% nitrogen.

EXAMPLE 2

These pre-emergent tests were made by a method in which the seeds were planted in a mixture of 50% sand and 50% soil in a large metal pan. After the seeds were planted the planting-medium was sprayed with an alcoholic solution of the carbamate in such a manner as to deposit thereon a definite amount of the herbicidal agent per acre. The soil was suitably watered at intervals and the action upon the growing plants was noted 14 days after planting.

The herbicidal effectiveness and selectivity of the respective compounds are expressed in the terms appearing, together with their significance, in the following tabulation:

No effect=N–0
Slight effect=S 1–3
Moderate effect=M 4–6
Severe effect=Sev 7–10
Total kill=Sev–10

On the scale, 0 stands for no visible effect, and 10 stands for complete inhibition of plant growth as evidenced by an absence of seedlings or by the killing of emergent seedlings.

Results obtained with 2-(1-chloropropyl) N-(3-chlorophenyl) carbamate are shown compared with those from isopropyl N-(3-chlorophenyl) carbamate in Table 1.

*Table 1*

| Plant Species Under Test | Dosage, number/acre | Plant Response (CIPC) | |
|---|---|---|---|
| | | 2-(1-chloropropyl) N-(3-chlorophenyl) carbamate | Isopropyl N-(3-chlorophenyl) carbamate |
| Cotton | 4 | N–0 | N–0 |
| | 8 | N–0 | N–0 |
| Stringbeans | 4 | N–0 | Sev–8 |
| | 8 | N–0 | Sev–8 |
| Peas | 4 | N–0 | Sev–10 |
| | 8 | N–0 | Sev–10 |
| Corn | 4 | N–0 | Sev–9 |
| | 8 | M–5 | Sev–9 |
| Crab grass | 4 | Sev–8 | Sev–9 |
| | 8 | Sev–9 | Sev–10 |
| Pigweed | 4 | M–6 | M–6 |
| | 8 | Sev–7 | Sev–8 |

It is quite apparent that the 2-(1-chloropropyl) N-(3-chlorophenyl) carbamate shows a marked selective action on crabgrass and pigweed—two very common weeds found in valuable crops. The less selective herbicidal activity of isopropyl N-(3-chlorophenyl) carbamate is equally marked and indicates the potential hazard of using the latter compound with all the crop plants except cotton.

The proportions and concentrations of the applied solutions or emulsions containing the compound are subject to considerable variation. In general, the more concentrated the emulsion, the less required. Regardless of concentration of the solution or emulsion, the amount of active ingredient applied will be such as is toxic to undesired plant life, i. e., growing plants or seed, depending upon whether the treatment is pre-emergent or post-emergent.

From the foregoing examples, it will be apparent that, by varying the severity of the treatment, the relative herbicidal effectiveness of the carbamate may be readily controlled.

What is claimed is:

1. An herbicidal composition comprising 2-(1-chloropropyl) N-(3-chlorophenyl) carbamate and a carrier, said compound being present in said composition in a phytotoxic concentration.

2. An herbicidal composition comprising an aqueous emulsion of 2-(1-chloropropyl) N-(3-chlorophenyl) carbamate, said compound being present in said composition in a phytotoxic concentration.

3. An herbicidal composition comprising 2-(1-chloropropyl) N-(3-chlorophenyl) carbamate, and a non-solvent fluent carrier, said compound being present in said composition in a phytotoxic concentration.

4. An herbicidal composition comprising a solution of 2-(1-chloropropyl) N-(3-chlorophenyl) carbamate in an organic solvent, said compound being present in said composition in a phytotoxic concentration.

5. As a new composition of matter, 2-(1-chloropropyl) N-(3-chlorophenyl) carbamate.

6. The method of selectively controlling plant growth comprising desired and undesired plant species, which comprises: treating the plant growth with 2-(1-chloropropyl) N-(3-chlorophenyl) carbamate in an amount and concentration which is phytotoxic to the undesired plant growth and substantially harmless to the desired plant growth.

7. The method of selectively controlling plant growth comprising desired and undesired plant species in the same soil, which comprises: treating the soil with 2-(1-chloropropyl) N-(3-chlorophenyl) carbamate in an amount and concentration which is phytotoxic to the undesired plant growth and substantially harmless to the desired plant growth.

8. The method of selectively controlling plant growth comprising desired and undesired plant species, which comprises: treating the foliage of the plant growth with 2-(1-chloropropyl) N-(3-chlorophenyl) carbamate in an amount and concentration which is phytotoxic to the undesired plant growth and substantially harmless to the desired plant growth.

No references cited.

Notice of Adverse Decision in Interference

In Interference No. 93,346 involving Patent No. 2,784,071, J. A. Garman and D. K. George, SELECTIVE HERBICIDE, final judgment adverse to the patentees was rendered Mar 5, 1965, as to claims 1, 2, 3, 4 and 5.

[*Official Gazette July 20, 1965.*]